(12) United States Patent
Hamaker et al.

(10) Patent No.: US 8,345,832 B2
(45) Date of Patent: Jan. 1, 2013

(54) ENHANCED VOICEMAIL USAGE THROUGH AUTOMATIC VOICEMAIL PREVIEW

(75) Inventors: Jon Hamaker, Issaquah, WA (US);
Keith Herold, Seattle, WA (US);
Michael Wilson, Sammamish, WA (US);
David Notario, Seattle, WA (US); Tom Millet, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 12/351,681

(22) Filed: Jan. 9, 2009

(65) Prior Publication Data

US 2010/0177877 A1 Jul. 15, 2010

(51) Int. Cl.
*H04M 1/64* (2006.01)

(52) U.S. Cl. ............. 379/88.11; 379/88.12; 379/88.14

(58) Field of Classification Search ............. 379/67.1, 379/68, 88.12, 88.13, 88.14, 88.16, 88.22, 379/142.04, 142.05; 704/1, 4, 200, 231, 704/235

See application file for complete search history.

(56) References Cited

U.S. PATENT DOCUMENTS

| | | | |
|---|---|---|---|
| 6,507,643 B1 | 1/2003 | Groner | |
| 6,775,651 B1 * | 8/2004 | Lewis et al. | 704/235 |
| 7,007,085 B1 * | 2/2006 | Malik | 709/224 |
| 7,039,585 B2 | 5/2006 | Wilmot et al. | |
| 7,386,452 B1 * | 6/2008 | Bates et al. | 704/270 |
| 7,623,633 B2 * | 11/2009 | Gatzke et al. | 379/88.12 |
| 8,054,961 B2 * | 11/2011 | Skubnik et al. | 379/210.01 |
| 8,121,263 B2 * | 2/2012 | Yao et al. | 379/88.13 |
| 2003/0026403 A1 * | 2/2003 | Clapper | 379/142.06 |
| 2003/0128820 A1 * | 7/2003 | Hirschberg et al. | 379/88.14 |
| 2005/0163289 A1 * | 7/2005 | Caspi et al. | 379/88.13 |
| 2006/0083357 A1 | 4/2006 | Howell et al. | |
| 2006/0210031 A1 | 9/2006 | Picard et al. | |
| 2006/0223502 A1 | 10/2006 | Doulton | |
| 2007/0129059 A1 | 6/2007 | Nadarajah et al. | |
| 2007/0174388 A1 * | 7/2007 | Williams | 709/204 |
| 2007/0207785 A1 | 9/2007 | Chatterjee et al. | |
| 2007/0271104 A1 * | 11/2007 | McKay | 704/270.1 |
| 2007/0280434 A1 | 12/2007 | Howell et al. | |
| 2008/0273675 A1 | 11/2008 | Siminoff | |
| 2009/0086937 A1 | 4/2009 | Horn et al. | |
| 2009/0170478 A1 * | 7/2009 | Doulton | 455/413 |
| 2009/0307090 A1 * | 12/2009 | Gupta et al. | 705/14.58 |

(Continued)

FOREIGN PATENT DOCUMENTS

WO 2008/103507 A1 8/2008

(Continued)

OTHER PUBLICATIONS

"International Search Report", Mailed Date: Jun. 24, 2010, Application No. PCT/US2009/066623, Filed Date: Dec. 3, 2009, pp. 11.

(Continued)

*Primary Examiner* — Olisa Anwah
(74) *Attorney, Agent, or Firm* — Turk IP Law, LLC (57) ABSTRACT

Textual preview of a voicemail is generated and provided through email or similar media to users along with the audio version. Transcription of the textual version, as well as additional capabilities such as actionable terms, playback-jump, switching between text and audio versions, direct or metadata based searchability, and enhanced response capabilities are provided based on contextual data obtained from voicemail metadata and user associated data stores such as contact list, email history.

19 Claims, 7 Drawing Sheets

U.S. PATENT DOCUMENTS

| | | | | |
|---|---|---|---|---|
| 2010/0056113 A1* | 3/2010 | Silverman | | 455/413 |
| 2010/0111270 A1* | 5/2010 | Langos | | 379/88.14 |
| 2010/0150322 A1* | 6/2010 | Yin et al. | | 379/88.14 |
| 2010/0153106 A1* | 6/2010 | Frazier et al. | | 704/235 |
| 2010/0158213 A1* | 6/2010 | Mikan et al. | | 379/88.14 |
| 2010/0158214 A1* | 6/2010 | Gravino et al. | | 379/88.14 |
| 2010/0166159 A1* | 7/2010 | Katis et al. | | 379/88.13 |

FOREIGN PATENT DOCUMENTS

| | | |
|---|---|---|
| WO | 2008103504 A1 | 8/2008 |
| WO | 2008103507 A1 | 8/2008 |

OTHER PUBLICATIONS

Verizon's Visual Voicemail May Be Free Cheap, But, I'm Sticking With PhoneTag—Published Date: Dec. 12, 2008, http://www.rimarkable.com/verizons-visual-voicemail-may-be-free-but-im-sticking-with-phonetag.

Look inside the new features of Microsoft's Communications Server "14"—Published Date: Mar. 25, 2010 http://searchunifiedcommunications.techtarget.com/news/column/0,294698,sid186_gci1506856,00.html.

First Office Action mailed on Jul. 5, 2012 in application 200980154470.0, filed Dec. 3, 2009, 12 pages.

* cited by examiner

FIG. 7 and
ENHANCED VOICEMAIL USAGE THROUGH AUTOMATIC VOICEMAIL PREVIEW

BACKGROUND

It is becoming common for users to have access to their voicemail in their email or instant messaging inbox. Primarily, this comes in the form of an audio attachment to an email (or instant message) where the audio contains the contents of the voicemail. The audio can be played back when desired. Processing of voicemail is often marked as a discontinuity in the information worker's typical communications workflow that is dominated by email and similar technologies.

Other approaches produce (either automatically or by use of humans) a transcription of the voicemail into the user's inbox. These services are typically not integrated into the user's normal data flow. Their primary value is derived from reading the transcription itself and, thus, a near-perfect transcription is important.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling voicemail preview in a combination of text and audio formats taking advantage of information automatically extracted from data sources associated with a user and voicemail metadata. In addition to back-and-forth switching capability between text and audio versions of the voicemail with playback-jump, elements of and interactions with the voicemail preview extend a value of the voicemail beyond simple reading of the text. According to some embodiments, information in the voicemail is surfaced and made actionable using contextual data.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a textual preview of a voicemail may be generated and provided through email or similar media to users along with the audio version. Transcription to a textual version, as well as additional capabilities such as actionable information is performed based on contextual data obtained from user associated data stores and voicemail metadata. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing communication applications utilized for voicemail preview delivery. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Moreover, the term "Voicemail preview" as used herein refers to textual data derived from a voicemail marked up with actionable items and integrated into a productivity service such as an email application, an instant message application and similar communication applications. The textual data may include machine transcriptions (e.g. automatic voice recognition), human transcriptions, and comparable forms that may reflect the complete voicemail or a summary of the same. According to some embodiments, the data derived from voicemail may also include graphical features.

Figure 1:
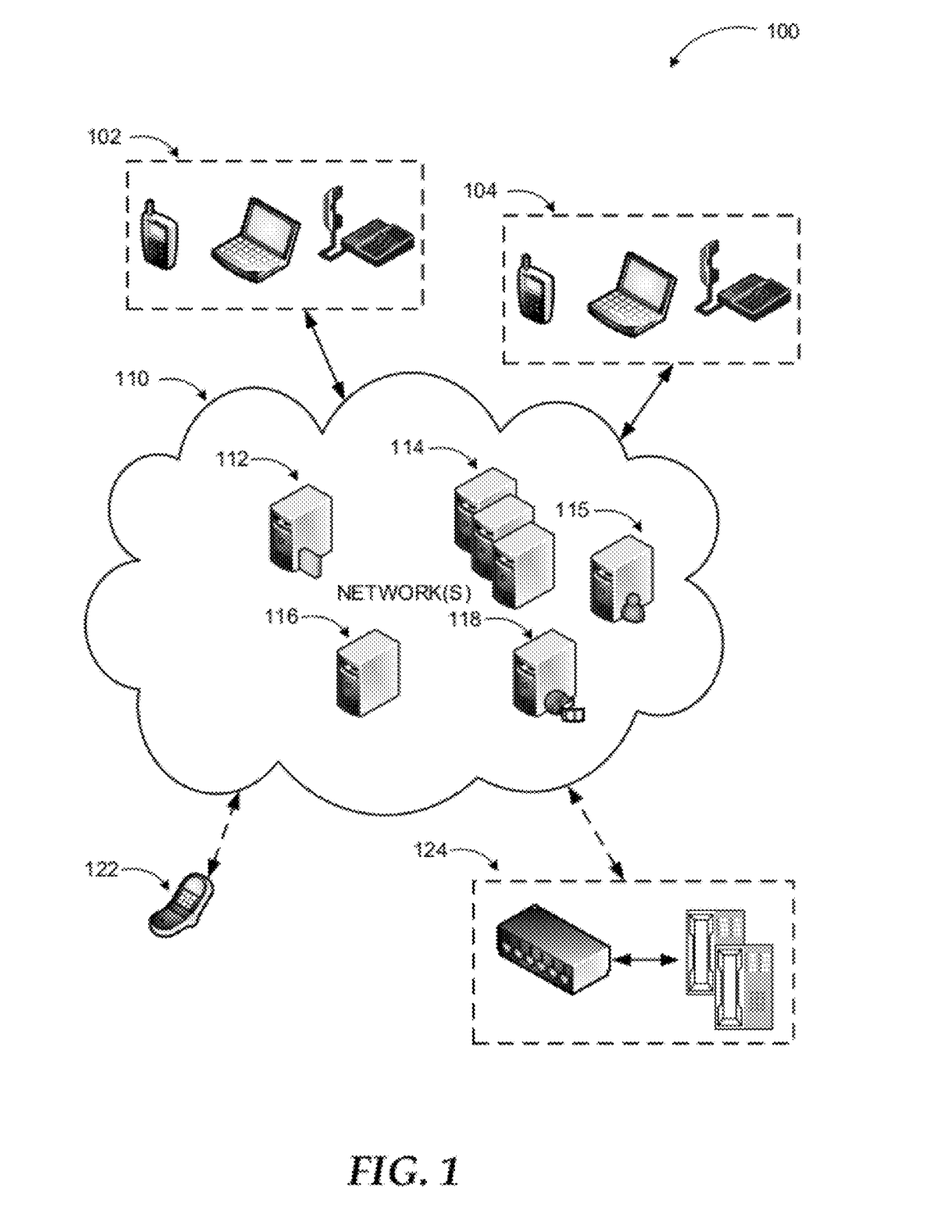
FIG. 1 is a diagram illustrating an example unified communications system, where embodiments may be implemented for enhanced voicemail usage through automatic voicemail preview.

Referring to FIG. 1, a diagram 100 of an example unified communications system, where embodiments may be implemented for enhanced voicemail usage through automatic voicemail preview, is illustrated. A unified communication system is an example of modern communication systems with a wide range of capabilities and services that can be provided to subscribers such as enhanced voicemail preview. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Voicemail server 115 may manage voicemails for subscribers of the UC system performing tasks like storage and delivery of voicemails, transcription of audio files into textual data and generation of enhanced voicemail preview emails or instant messages according to some embodiments. Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

While the example system in FIG. 1 has been described with specific components such as mediation server, A/V server, and similar devices, embodiments are not limited to this system of the example components and configurations. A service for enhanced voicemail preview may be implemented in other systems and configurations employing fewer or additional components. Furthermore, such systems do not have to be enhanced communication systems integrating various communication modes. Embodiments may also be implemented for voicemails delivered in traditional communication systems such as PSTN or cellular networks using the principles described herein.

Figure 2:
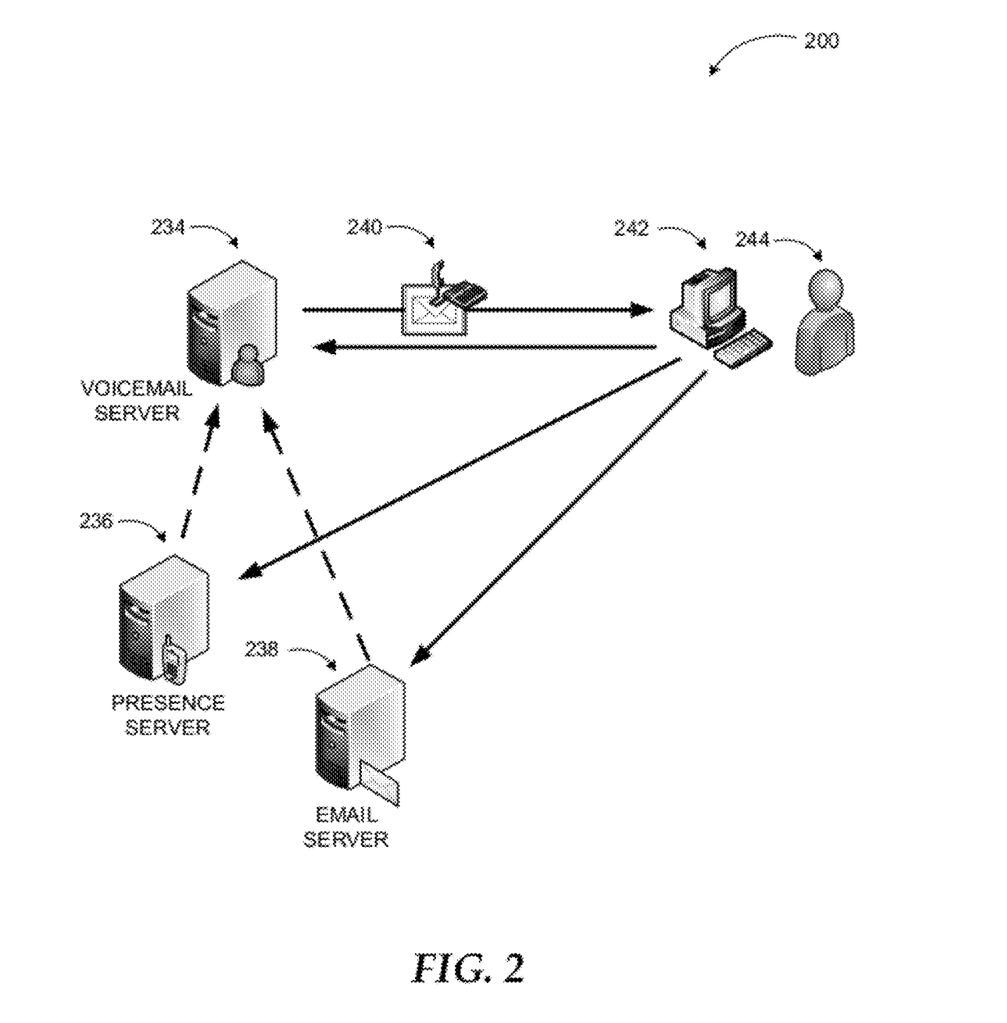
FIG. 2 is a conceptual diagram illustrating a basic example system for providing enhanced voicemail preview.

FIG. 2 is a conceptual diagram 200 illustrating a basic example system for providing enhanced voicemail preview. While a system according to embodiments is likely to include a number of servers, client devices, and services such as those illustratively discussed in FIG. 1, only those relevant to embodiments are shown in FIG. 2.

As discussed previously, there are many situations, where listening to voicemail, even in form of an attached recording, is not possible or is inconvenient. A text form of the voicemail is beneficial in many instances, but available solutions have previously mentioned shortcomings inherent in transcriptions. Embodiments provide technologies supporting the integration of voicemail more thoroughly and more richly into the user's information workflow. This integration into the user's most prevalent information processing (email, instant messaging, and similar forms) is aided by the context available in the user's data store and provides additional capabilities beyond the simple reading of the message such as audio navigation, contact generation, search over voicemail, instant message behavior, and comparable ones.

According to some embodiments, a textual preview of the voicemail is generated by means of automatic speech recognition and delivered it to the recipient through email, instant message, or similar messaging technology. A speech recognizer is integrated directly with the voicemail and messaging systems, according to one embodiment. Due to this deep integration, the speech recognizer is able to leverage significant contextual information about the caller and callee to improve the recognition accuracy (fidelity). This includes, but is not limited to, the names of the parties, their respective contact lists, their organizational structures, previous communications between the parties, communications relevant to the parties, etc. As mentioned above, however, embodiments are not limited to data generated by automatic speech recognition. Actionable items and contextual information may also be provided employing human transcribed data, combination of human transcribed and machine generated data, and comparable information that is marked up in a schema decipherable by client applications.

Thus, voicemail server 234 in the example system receives the voicemail in audio form and further receives contextual information from sources like presence server 236, email server 238, and so on. For example presence information may include location associated with the caller and words in the voicemail may be recognized with higher accuracy based on the knowledge of where the caller is. Voicemail server 234 may process the text from the speech recognizer or another transcription source such that key information (e.g. names or key points) can be identified, specially rendered, and made actionable as appropriate for the user's benefit. A rendering sub-system may use further contextual information along with the conceptual highlighting provided by the speech sub-system to provide a visual representation of the voicemail for the user. The rendered voicemail preview 240 may be provided to the user's (244) messaging application executed on computing device 242 to be presented by a messaging user interface. According to other embodiments, client applications (instead of voicemail server) may integrate various information sources such as presence into the voicemail preview message.

An example implementation of a messaging application for delivering enhanced voicemail preview is email. An email message may deliver the rendered voicemail preview along with an audio file of the voicemail such that switch back between the textual data and the audio file is enabled along with search capability allowing the recipient to search easily for portions of the audio file in addition to having the capability to request/perform actions based on the information in the voicemail. While email and instant messaging is frequently referred to as example services to which a voicemail preview may be integrated, embodiments are not limited to those. Other messaging systems such as SMS, RSS feeds, and comparable ones may also be employed in providing an enhanced voicemail preview experience to users.

Figure 3:
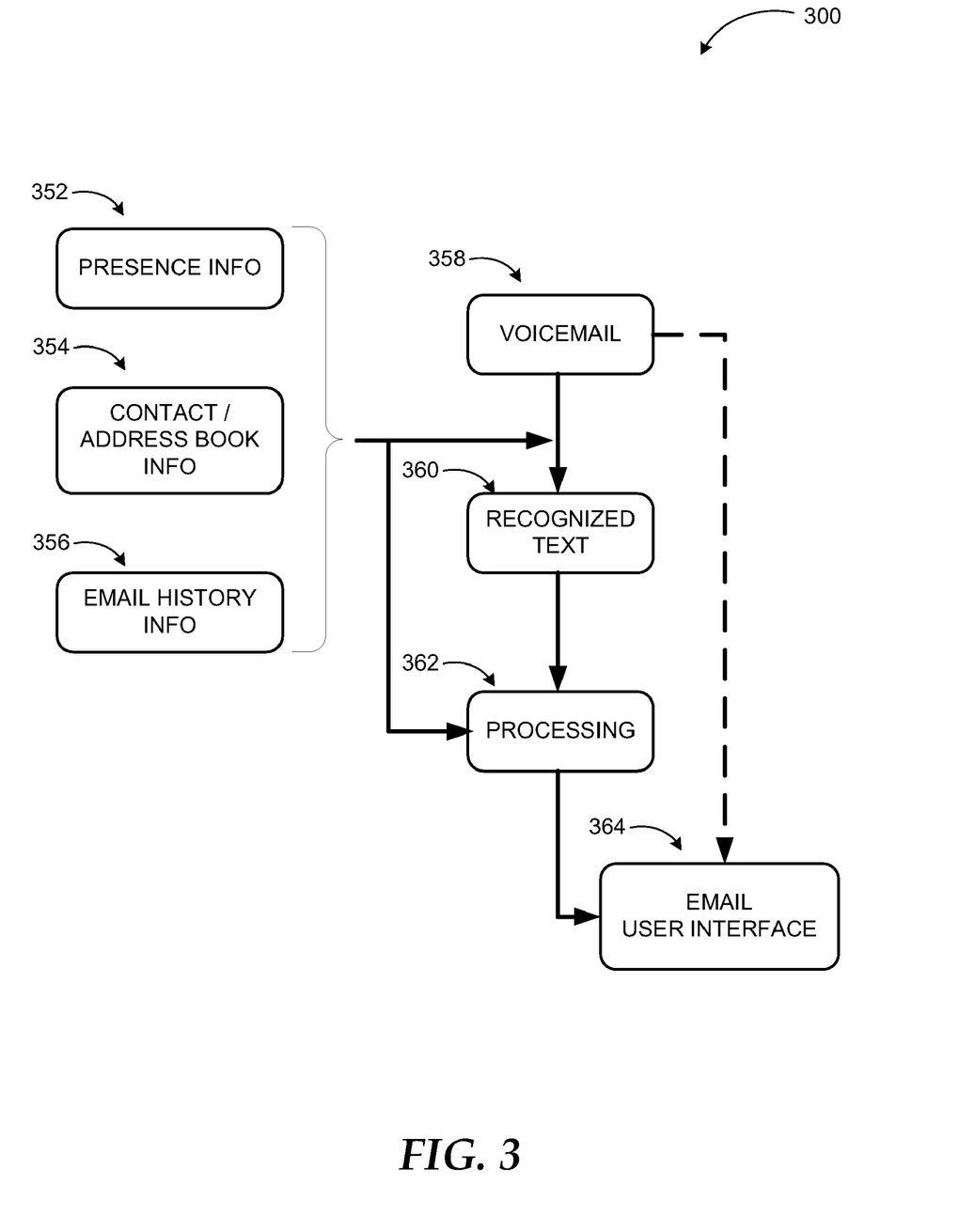
FIG. 3 is illustrates major components in providing enhanced voicemail preview according to embodiments.

FIG. 3 is illustrates major components in providing enhanced voicemail preview according to embodiments in diagram 300. As discussed above, contextual information such as presence information 352, contact/address book information 354 (associated with the caller and/or callee), email history information 356, and similar data is used at various stages of generating enhanced voicemail preview.

For example, the audio version of the voicemail 358 may be transcribed into a rich text form 360 (with actionable terms, highlights, and other features) using the contextual information to improve accuracy of transcription and to add the features. The rich text forms 360 of the voicemail may then be further processed (362) with additional features again using the contextual information. The information used at different stages may be distinct. For example, caller associated information may be used in one stage, while callee associated information may be employed for the other stage.

The end product of processing 362, the enhanced voicemail preview may be integrated into an email message along with the audio version of the voicemail (358) and presented to the subscriber through an email user interface 364. The audio version of the voicemail may be attached to the email message or a link to its location may be provided.

Through these major components and their interactions, voicemail is integrated into email workflow along with presence information. Key portions of the voicemail are made actionable, and advanced navigation of the voicemail audio is provided allowing the subscriber to "jump" to any location in the voicemail audio file by clicking on the appropriate text (i.e. playback jump or audio repositioning). Thus, the voicemail's text representation is presented such that the subscriber can more easily find key information without distraction from the typically present speech recognition errors.

The above discussed scenarios, example systems, applications, and configurations are for illustration purposes. Embodiments are not restricted to those examples. Other forms of transcription, configuration, communication modes, and scenarios may be used in implementing enhanced voicemail preview in a similar manner using the principles described herein.

Figure 4:
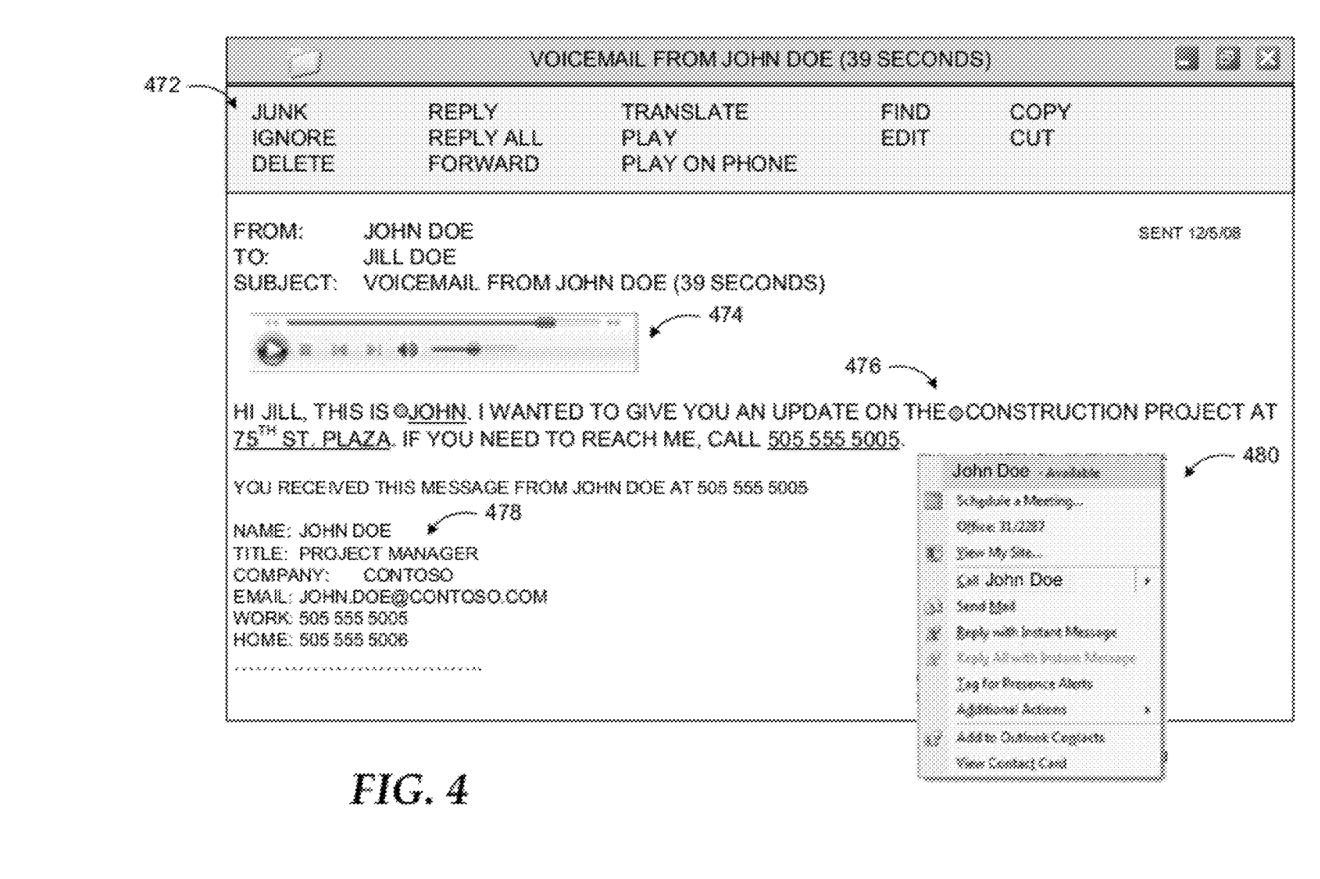
FIG. 4 illustrates a screenshot of an example user interface for providing enhanced voicemail preview.

FIG. 4 illustrates a screenshot of an example user interface for providing enhanced voicemail preview. The elements and configuration of the user interface on the screenshot are for illustration purposes only and do not constitute a limitation on embodiments. A messaging application capable of presenting enhanced voicemail previews to users may employ any user interface with other elements and configurations. Example user interface includes standard graphic and textual elements 472 such as commands, options, and other items.

The voicemail rendering provides information to the email user interface, which assists in navigation and playback of the voicemail audio. For example, clicking on a word in the textual voicemail rendering 476 may start playing the voicemail from the position in which that word was spoken. Highlighting a set of words may play just that segment of the voicemail audio. In addition to the text-audio connection, a standard audio playback user interface element 474 may also be provided.

Portions of the voicemail rendering are made actionable in the email user interface by integrating with presence information available to the email system. For example, right-clicking on a name brings up a list of actions that a user may want to carry out relative to the name such as adding that name to the user's contact list, contacting the named person via an instant message, placing a voice call to the named person, and similar actions. The actions may be presented in a pop-up menu 480 or similar user interface elements (hovering display element, drop-down menu, and the like).

The rendered textual voicemail 476 may include graphic or color scheme based elements to provide additional information on syntax and actionable words. Furthermore, the information available in the rendered voicemail may be added to the search index of the email server. Thus, voicemails are made searchable both in the text that is rendered and, potentially, in the metadata underlying the text. The previewed data is also searchable via desktop search systems, mobile device systems, and so on, not just servers. The email carrying the voicemail preview may include the names of the caller and callee, as well as the caller's detailed presence information to enable the callee take proper action based on the information in the email.

A user interface for a messaging application capable of presenting voicemail preview may include additional or fewer textual and graphical elements, and may employ various graphical, color, and other configuration schemes to display different functionalities and associated processes.

Figure 5:
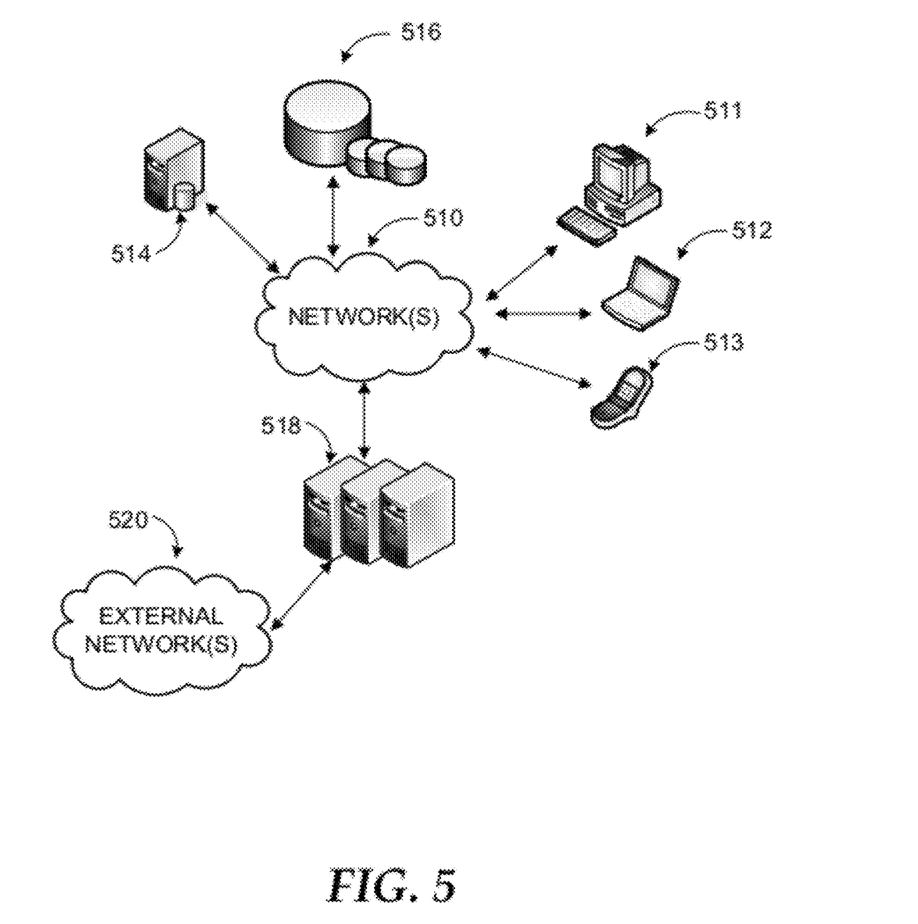
FIG. 5 is a networked environment, where a system according to embodiments may be implemented.

FIG. 5 is an example networked environment, where embodiments may be implemented. A platform providing communication services with enhanced voicemail preview may be implemented via software executed over one or more servers 518 such as a hosted service. The platform may communicate with client applications on individual computing devices such as a cellular phone 513, a laptop computer 512, and desktop computer 511 (client devices) through network(s) 510.

As discussed above, voicemail may be delivered from a number of sources including traditional phone systems, enhanced communication systems, and so on, within the network(s) 510 or through external network(s) 520 to a voicemail management application/server. The voicemail management application/server may receive additional information including, but not limited to, presence information, contact information, as well as voicemail metadata. This contextual information may be utilized in transcription of the voicemail into textual data and generation of advanced capabilities such as actionable data to be presented in a textual communication to a subscriber receiving the voicemail.

Client devices 511-513 are used to facilitate communications through a variety of modes between subscribers of the communication system. Information associated with subscribers and facilitating enhanced voicemail preview may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks (e.g. external network(s) 520). Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a voicemail preview system with advanced capabilities. Furthermore, the networked environments discussed in FIG. 5 are for illustration purposes only. Embodiments are not limited to the example applications, modules, or processes.

Figure 6:
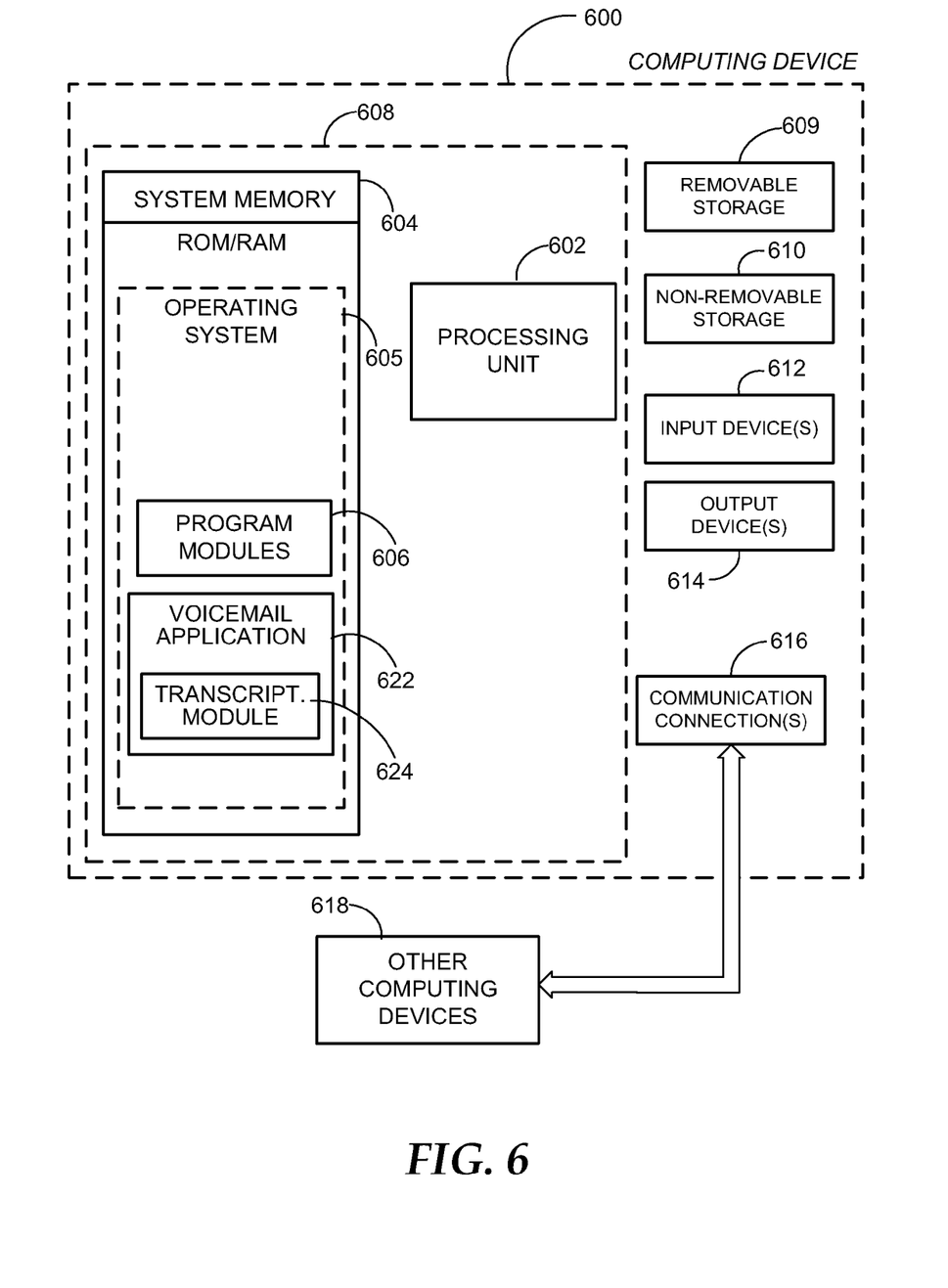
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 800 may be a voicemail management server as part of a communication system and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, voicemail application 622, and transcription module 624.

Voicemail application 622 may be part of a service that facilitates communication through various modalities between client applications, servers, and other devices (e.g. voice, email, instant messaging, etc.). Transcription module 624 may transcribe audio voicemail files into textual data using contextual information as discussed previously. Transcription module 624 and voicemail application 622 may be separate applications or integral modules of a hosted service that provides enhanced communication services to client applications/devices such as voicemail preview with actionable information through email or instant messaging. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, email or presence servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
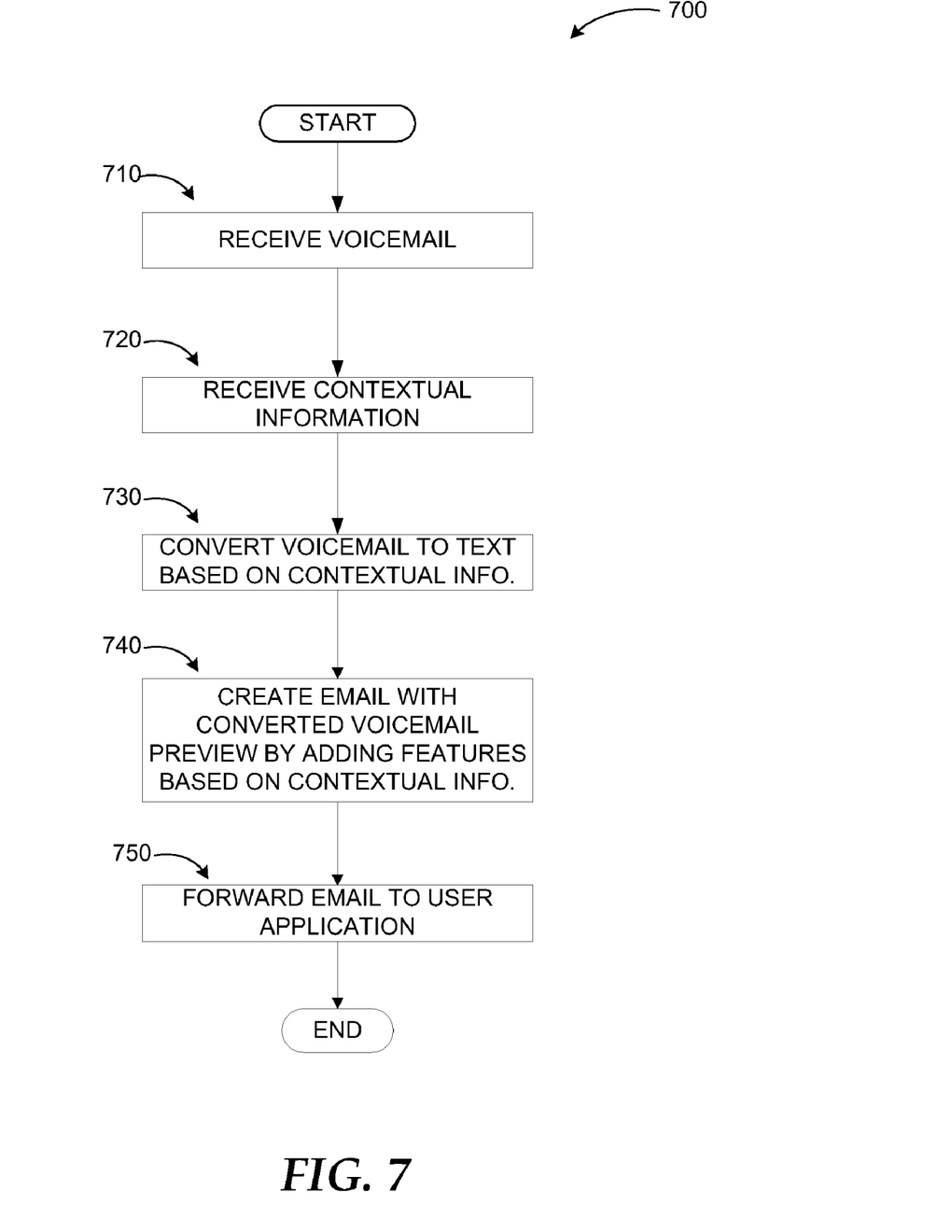
FIG. 7 illustrates a logic flow diagram for providing enhanced voicemail preview according to embodiments.

FIG. 7 illustrates a logic flow diagram of process 700 for providing enhanced voicemail preview according to embodiments. Process 700 may be implemented as part of an enhanced communication system in a voicemail server.

Process 700 begins with operation 710, where a voicemail is received for a subscriber associated with the voicemail server. The voicemail may be stored as an audio file. At operation 720, contextual information such as presence or contact information associated with the subscriber (and their contacts), email history information, and voicemail metadata (a source of the voicemail and any additional information that may be included with the voicemail in an enhanced communication system) may be received by the voicemail server.

At operation 730, the audio voicemail is transcribed into textual data using the contextual information. The contextual information is not only used to improve fidelity of the transcription, but it may also be used to surface information within the voicemail in textual format. As discussed previously, embodiments are not limited to automatic voice-recognition based transcriptions or textual data. Other forms of conversion from voicemail into textual and/or graphical data may be utilized to provide enhanced voicemail preview. At operation 740, the transcribed voicemail is further processed based on contextual information such as rendering some of the information actionable, adding color/graphics schemes to improve presentation, switch-back and search capability on the audio file, and similar actions. This enhanced voicemail preview may be integrated into an email, instant message, or similar text-based communication message. The message may also include a copy of the audio version of the voicemail or a link to a location of the audio file. At operation 750, the message including the enhanced voicemail preview may be forwarded to the subscriber.

Some or all of the actionable items may be presented to the subscriber upon completion of an authorization process. Actions provided to the called subscriber based on key portions of the voicemail preview may include actions to be performed by an email application displaying the voicemail preview or actions to be performed by other applications. Furthermore, elements of the email user interface displaying the voicemail preview may be dynamically modified based on the actionable items in the voicemail preview.

The operations included in process 700 are for illustration purposes. Enhanced voicemail preview via email or instant messaging may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing enhanced voicemail preview, the method comprising:
    receiving an audio voicemail for a user;
    determining contextual information associated with the user and a calling party;
    determining key contact and presence information associated with an availability of the calling party from the contextual information;
    generating a voicemail preview based on a transcription of the audio voicemail employing at least presence information such that an accuracy of audio-text fidelity is increased and a plurality of actionable items are provided in the voicemail preview;
    integrating the voicemail preview into a text-based communication for delivery to the user along with access to the audio voicemail; and
    presenting the key contact and presence information associated with the availability of, a location of, and prior communication information with the calling party along with the voicemail preview.

2. The method of claim 1, wherein the contextual information includes at least one from a set of: voicemail metadata, presence information, contact information, organizational information, and relevant communication information.

3. The method of claim 1, wherein the text-based communication includes one of: an email, an instant message, an SMS message, and an RSS feed message.

4. The method of claim 1, further comprising:
    identifying key information in the voicemail preview based on the contextual information;
    rendering the identified key information actionable; and
    presenting the actionable key information in a special manner.

5. The method of claim 4, wherein the key information includes at least one form a set of: a name, a place, a phone number, an address, a date, a time, an email address, and a web address.

6. The method of claim 4, wherein rendering the key information actionable includes providing a list of actions for selection by the user in response to receiving an indication of user interest on a key information term.

7. The method of claim 1, wherein access to the audio voicemail includes one of: providing the audio voicemail in an attached file and providing a link to a location where the audio voicemail is stored.

8. The method of claim 1, wherein at least a portion of the actionable items are presented to the user upon completion of an authorization process, and wherein new contextual information is generated during the voicemail preview generation process.

9. The method of claim 1, wherein the audio voicemail is rendered searchable through the voicemail preview and through metadata underlying the voicemail preview.

10. A communication system for implementing enhanced voicemail preview, the system comprising:
    a voicemail server configured to:
    receive a voicemail in audio format for a called party;
    determine contextual information comprising voicemail metadata, presence information associated with an availability of a calling party, contact information, location information, and prior communication information;
    generate a voicemail preview based on a transcription of the voicemail, wherein presence information is employed to enhance an audio-to-text fidelity;
    determine actionable terms within the transcription based on the voicemail using the contextual information;
    insert additional textual and graphical information into the transcription based on the contextual information resulting in the voicemail preview, wherein the audio voicemail is navigable through selection of corresponding textual elements in the transcription;
    render the voicemail preview integrated into an email message including the actionable terms, key contact and presence information associated with the availability of the calling party determined as part of the contextual information, and the additional textual and graphical information for delivery to a client application; and cause the voicemail preview to be presented to the called party through an email user interface of a client application, wherein the voicemail preview includes access to the voicemail.

11. The system of claim 10, wherein the voicemail preview enables the called party to play back the voicemail in audio format starting at a selected point by indicating a textual element corresponding to the selected point.

12. The system of claim 10, wherein the voicemail preview enables the called party to play back a portion of the voicemail in audio format by highlighting a portion of the voicemail in text format.

13. The system of claim 12, wherein the voicemail preview enables the called party to utilize playing back the voicemail in audio format and reading the voicemail in text format independently through clicking on a user interface element.

14. The system of claim 10, wherein the voicemail preview further includes an audio playback interface element.

15. The system of claim 10, wherein at least one of a graphic scheme and a color scheme are used to provide additional information on a syntax and actionable items in the transcription of the voicemail.

16. A method to be executed at least in part in a computing device for providing enhanced voicemail preview, the method comprising:

receiving an audio voicemail for a called party;

converting the audio voicemail into a textual representation employing presence information associated with an availability of a calling party and voicemail metadata associated with the called party and the calling party such that an accuracy of audio-text fidelity is increased;

integrating the textual representation into an email workflow for the called party as a voicemail preview, wherein key portions of the voicemail preview are rendered actionable upon user selection, and wherein the audio voicemail is navigable through selection of corresponding textual elements in the text representation; and presenting the voicemail preview and presence information associated with the availability of, a location of, and prior communication information with the calling party to the called party through an email user interface.

17. The method of claim 16, wherein actions provided to the called party based on key portions of the voicemail preview include actions to be performed by an email application displaying the voicemail preview and actions to be performed by other applications.

18. The method of claim 16, wherein elements of the email user interface displaying the voicemail preview are dynamically modified based on the actionable items in the voicemail preview.

19. The method of claim 16, wherein voicemail metadata is used to obtain presence information associated with the calling party and to present the presence information within the voicemail preview.

* * * * *